United States Patent [19]
Rudenschöld

[11] Patent Number: 5,131,093
[45] Date of Patent: Jul. 21, 1992

[54] ARRANGEMENT FOR HEADGEAR

[76] Inventor: Carl Rudenschöld, Box 53402, S-400 18 Göeborg, Sweden

[21] Appl. No.: 663,899

[22] PCT Filed: Oct. 5, 1989

[86] PCT No.: PCT/SE89/00545
§ 371 Date: Mar. 18, 1991
§ 102(e) Date: Mar. 18, 1991

[87] PCT Pub. No.: WO90/03741
PCT Pub. Date: Apr. 19, 1990

[30] Foreign Application Priority Data
Oct. 6, 1988 [SE] Sweden .................. 8803558
Nov. 16, 1988 [SE] Sweden .................. 8804142

[51] Int. Cl.⁵ .................................... A61F 9/00
[52] U.S. Cl. ........................................ 2/10; 2/196; 2/199; 2/209.1

[58] Field of Search .............. 2/10, 12, 13, 15, 171, 2/185 R, 195, 196, 199, 209.1, 422; 351/155, 158

[56] References Cited

U.S. PATENT DOCUMENTS

| 2,445,355 | 7/1948 | Hurt | 2/10 |
| 2,614,255 | 10/1952 | Ellis | 2/12 |
| 4,839,926 | 6/1989 | Choi | 2/10 |
| 4,951,316 | 8/1990 | Moody | 2/10 |

FOREIGN PATENT DOCUMENTS 1477818 6/1977 United Kingdom ............. 2/199

Primary Examiner—Werner H. Schroeder
Assistant Examiner—Diana L. Biefeld
Attorney, Agent, or Firm—Dvorak and Traub

[57] ABSTRACT

Lightweight foldable headgear with sun visor and detachable collapsible binoculars for shielding light and improving the wearer's ability to view events or other sights.

6 Claims, 5 Drawing Sheets

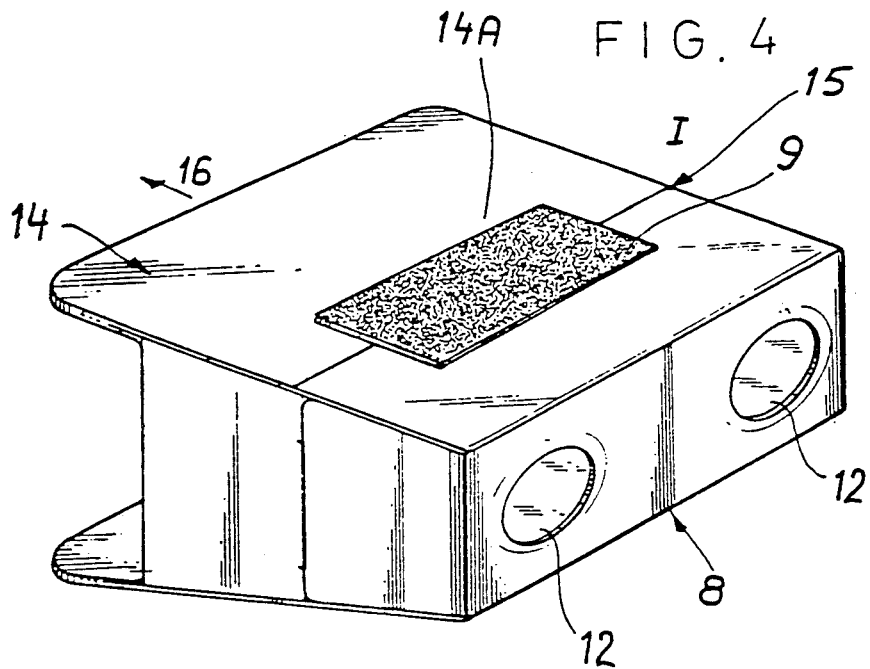
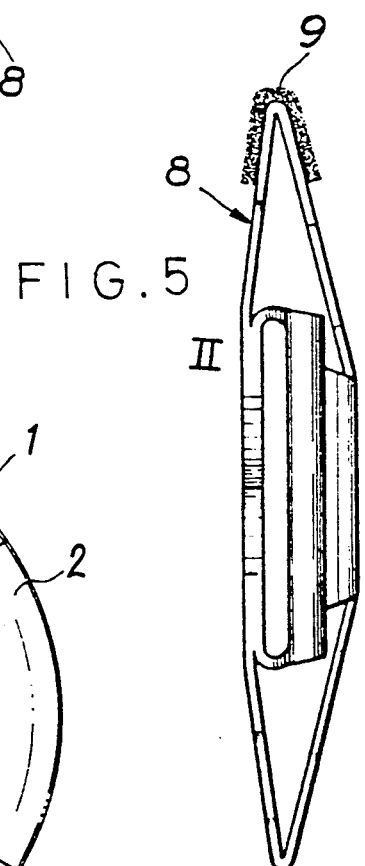
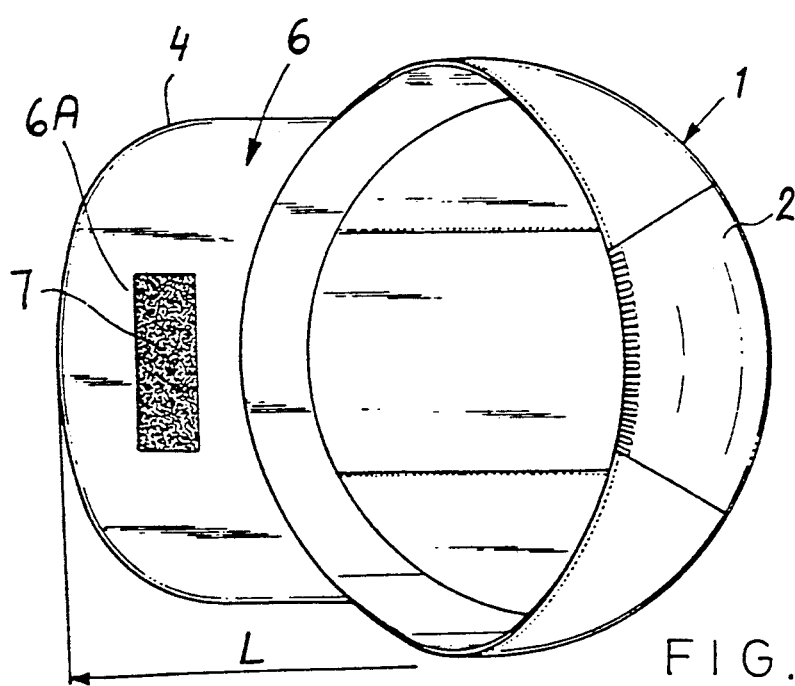

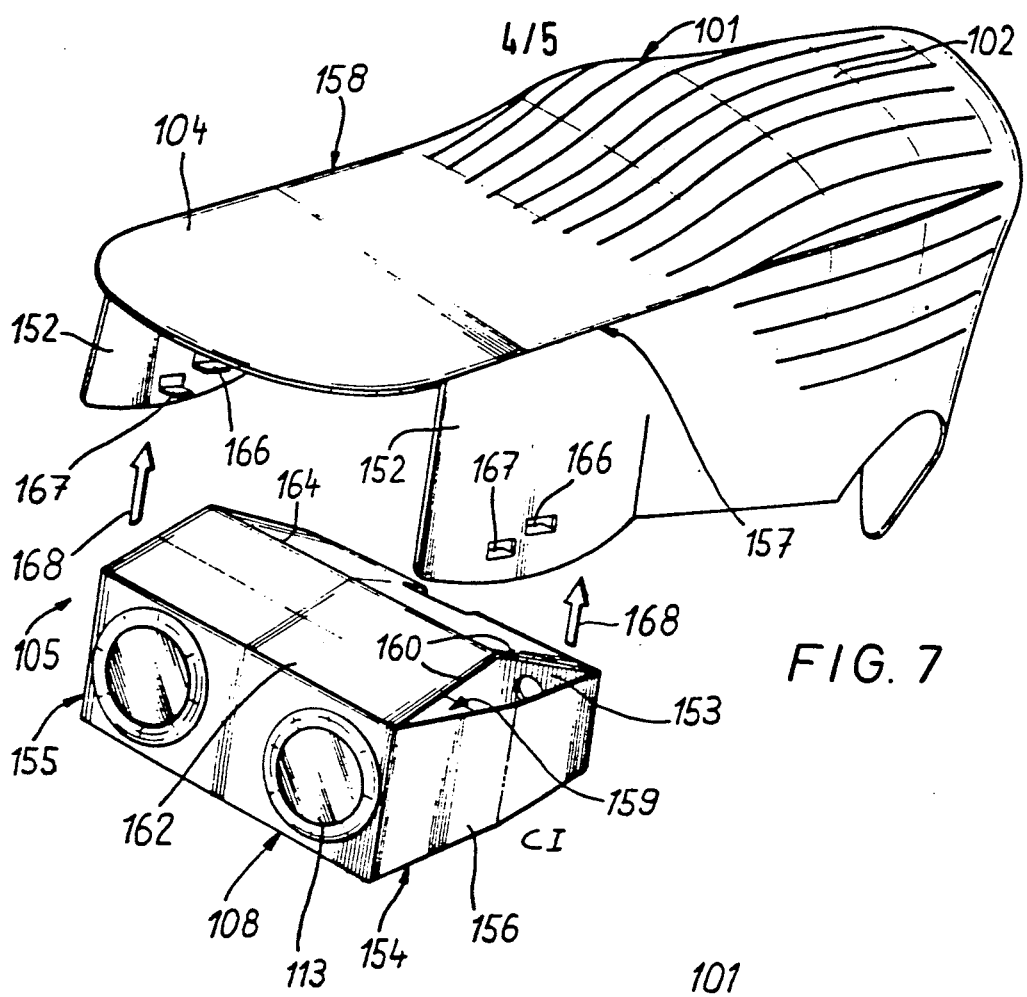
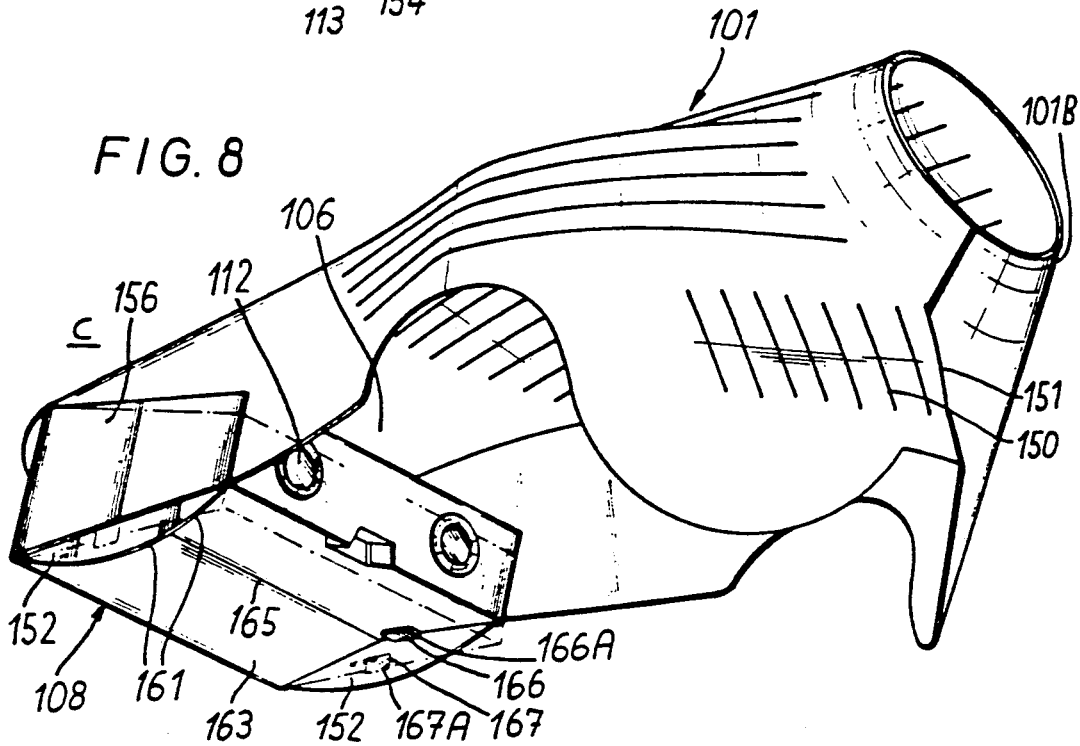

ARRANGEMENT FOR HEADGEAR

The present invention relates to an arrangement for headgear which at least exhibits a sum visor on its front.

It is normally tiring for a person to hold up a pair of binoculars for a long period, for example at sporting events such as tennis, football and horse races, or at musical performances such as pop concerts, irrespective of the weight of the binoculars and the fact that it may be difficult to coordinate movements between the user's head and hands in order rapidly and precisely to obtain the desired view through the binoculars.

The principal object of the present invention is thus, inter alia, in the first instance to solve said problems by simple but efficient means, and in so doing at the same time to permit mass production in order to present a certain message, such as advertising or information, on the items of headgear in question.

Said object is achieved by means of an arrangement in accordance with the present invention, which is characterized essentially in that a pair of binoculars is detachably attached to the visor by attachment means in such a way as to be supported on the underside of the visor in the area in front of the user's eyes.

The invention is described below as a number of preferred illustrative embodiments, in conjunction with which reference is made to the drawings, in which:

FIGS. 1-5 show a first illustrative embodiment of the invention, where

FIG. 1 shows the invention being worn by a person;

FIG. 2 shows a side view of a person with a pair of binoculars supported on an item of headgear;

FIG. 3 shows an item of headgear viewed from below and without any binoculars attached thereto;

FIG. 4 shows a preferred pair of binoculars in perspective, viewed at an angle from the rear;

FIG. 5 shows the binoculars in a collapsed state;

FIGS. 6-8 show a second illustrative embodiment of the invention, where

FIG. 6 shows the invention being worn by a person;

FIG. 7 shows an exploded view of the invention;

FIG. 8 shows the invention in the assembled, attached position viewed at an angle from below;

Figure 1:
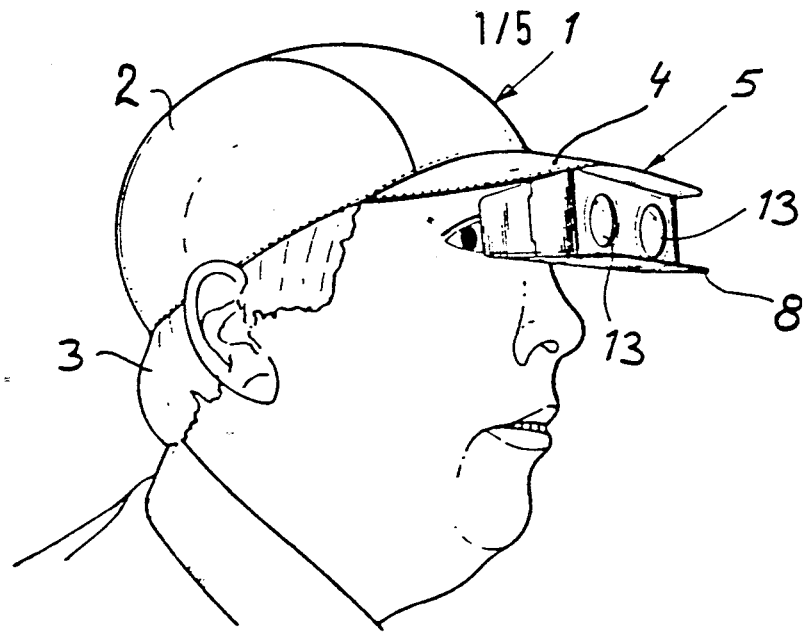
Figure 2:
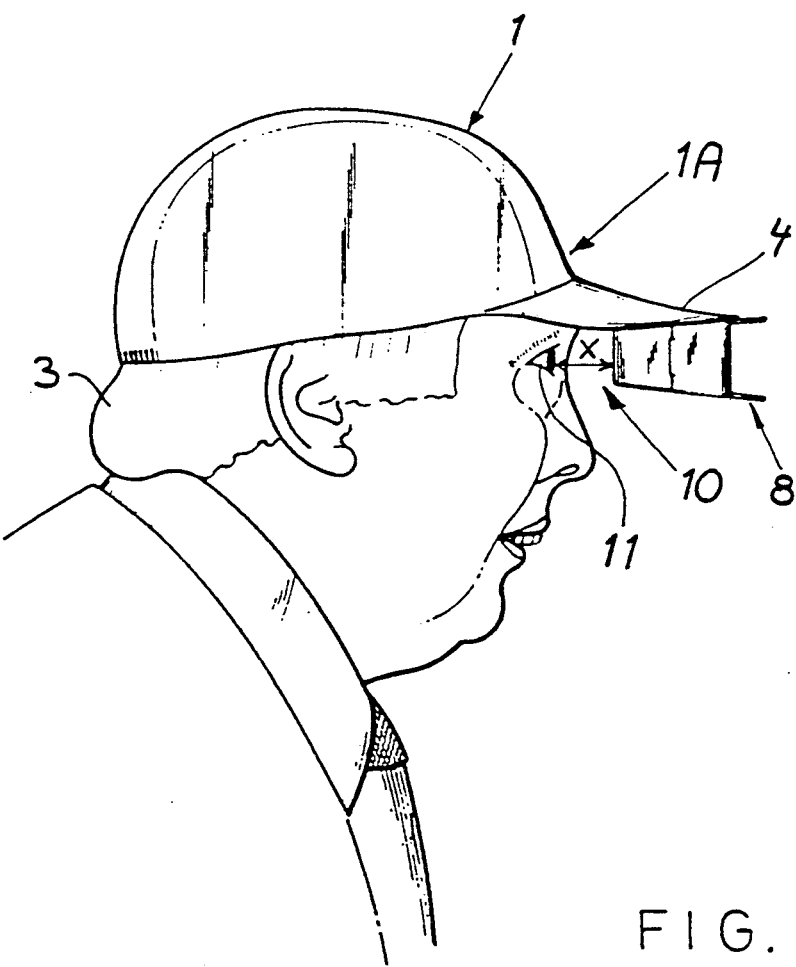

An item of headgear 1, preferably consisting of a cap or similar, which has a bowl-shaped part 2 covering the head 3 of a person wearing the cap, etc., and a sum visor 4 on its front 1A, but which can also consist of some other headgear of the kind intended, which is nevertheless subject to the requirement that it shall at least exhibit a sun visor of this kind on the front of the headgear, for example resembling a banker's visor, is part of an arrangement 5 in accordance with the present invention. Said arrangement 5 involves the provision on the underside 6 of the visor of attachment devices 7 of an appropriate kind which permit the detachable connection of a pair of binoculars 8 to said headgear 1. The attachment device 7 in question is so arranged as to interact with a complementary attachment element 9, which is capable of application to a pair of binoculars 8 of said kind intended to be capable of connection as required to the headgear 1 for the purpose of permitting the detachable support of the binoculars 8 on the underside 6 of the visor in an area 10 in front of the wearer's eyes 11.

Said attachment device and attachment element appropriately consist of a so-called 'Velcro' fastener 7 and 9, preferably in the form of 'Velcro' strip or similar. Said strips, etc., 7, 9, are attached in such a way to the visor 4 and the binoculars 8 as to extend across same.

An appropriate pair of binoculars 8 to be supported by a visor 4 without the visor 4 being caused to bend downwards excessively, or without the cap 1 falling from the person, is a pair of binoculars 8 of a kind which is made of cardboard for some other sheet material with appropriately attached lenses, etc., 12, 13, and which is capable of being folded from an unfolded binocular position I, for example as shown in FIG. 4, and a collapsed storage position II, for example as shown in FIG. 5. A 'Velcro' strip 9 can thus be attached to upper surface 14 of the binoculars 8 in such a way that is also covers at least a part of a scored line 15 which extends across the binoculars 8 and their direction of vision 16.

Said 'Velcro' strips 7, 9 are preferably capable of being applied to the intended attachment surface 6A, 14A by heating and/or pressing against the intended attachment point, in so doing activating an attachment agent, such as adhesive or glue, etc., which has been applied to the rear surface of said 'Velcro' strip.

A further effect is achieved thanks to the invention through the arrangement of the binoculars 8 in such a way as to be capable of attachment to the visor 4 at a selected distance X from the eyes 11 of the wearer such that unobstructed forward vision can be achieved through rearward inclination of the wearer's head 3, so that the visor 4 and thus also the binoculars 8 are raised together into a position in which they face forwards and upwards at an angle and permit an unobstructed view beneath the binoculars 8, which can be advantageous if it is wished to look at close objects without the help of the binoculars.

A further effect which can be achieved is to cause the extension of the effective length L of the visor in front of the wearer by arranging the binoculars 8 in such a way as to be capable of attachment so that they represent an extension of the visor 4.

When it is wished to use the binoculars 8, the binoculars are taken out, and the collapsible binoculars 8 are raised from their folded position II into the effective binocular position I and are attached to the visor 4 of an intended item of headgear by means of an attachment device 7 or an attachment element 9 which have already been attached.

The possibility is also afforded for the attachment of the attachment device 7 and the attachment element 9 by some other appropriate means to suitable patterns, for example a number of attachment devices running in the longitudinal sense of the visor and situated at a certain distance from one another.

Figure 6:
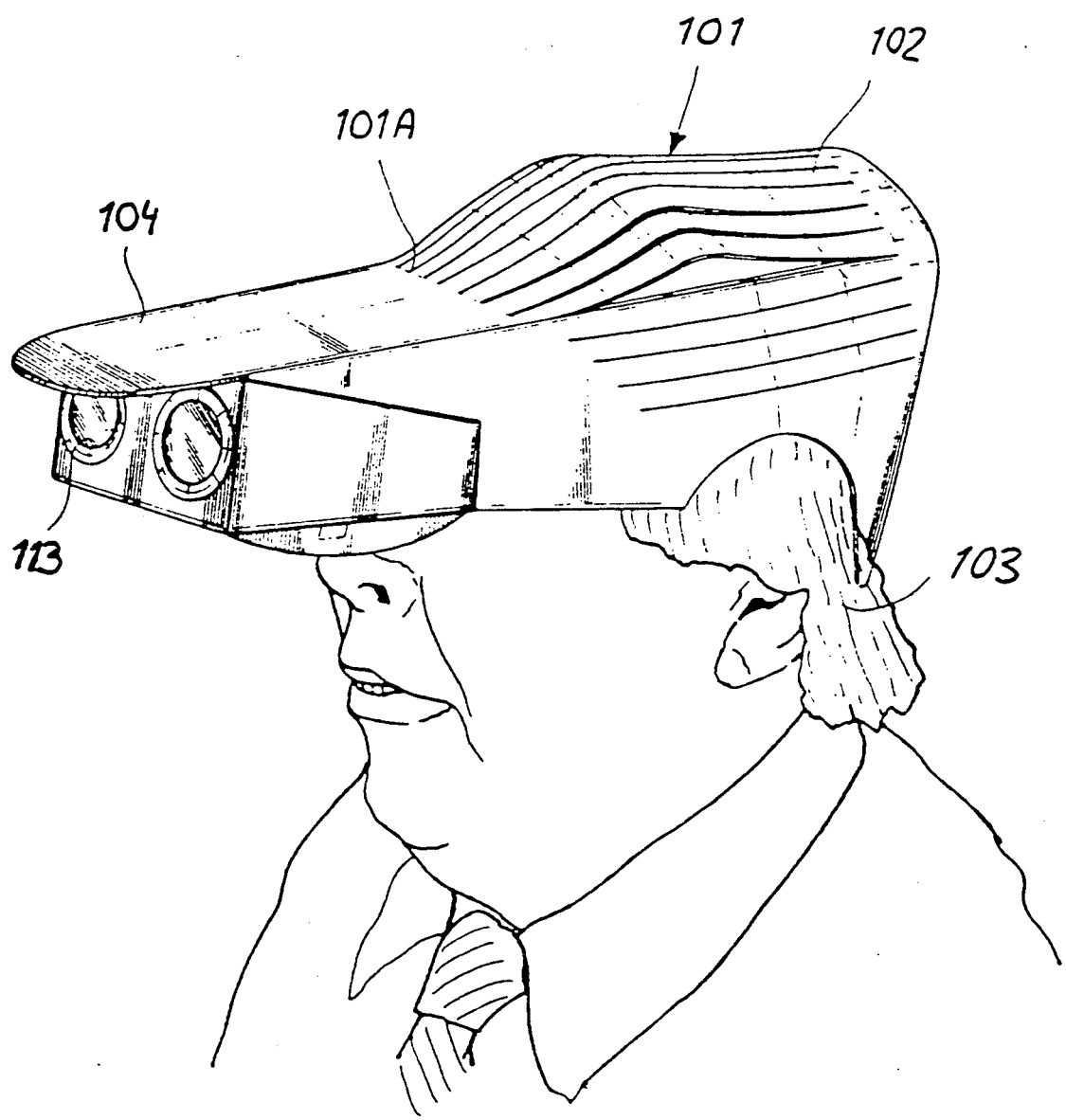

A further illustrative embodiment of the invention is shown in FIGS. 6-8 in the drawings, and an item of headgear 101 utilized in this case is of the kind which is made from sheet material and is capable of being folded to produce a cap, which is retained in the intended size position to which it has been adjusted by means of a locking tongue 151 capable of being accommodated in an appropriate slot 150, so as to form a bowl-shaped upper part 102, which covers the head 103 of a wearer of the cap, etc., as well as a sun visor 104 projecting forwards at an angle from the upper part 102 on the front 101A of the cap.

An arrangement 105 for the detachable connection of a pair of binoculars 108 to the cap 101 comprises attachment means 152, 153 of an appropriate kind. Said attachment means preferably consist of attachment devices 152 which extend between the binoculars 108 and the visor 104, which are preferably lockable in an intended attachment position C, so that the binoculars 108 can be securely supported on the under side 106 of the visor in the area in front of the wearer's eyes.

The binoculars 108 in said case are appropriately also in the form of a pair of binoculars which are made from cardboard or some other suitable sheet material with suitably attached lenses, etc., 112, 113, and which are capable of being folded between the unfolded binocular position CI and a collapsed storage position (not shown).

These binoculars 108 are preferably also so arranged as to be capable of attachment to a visor 104 at a selected distance in front of the wearer's eyes, such that an unobstructed view forwards can be achieved simply by the rearward inclination of the wearer's head 103 in a similar fashion to that in the first example.

Said attachment device consists of uprights 152 which project outwards in a downward direction from the visor 104. Said upright 152 is capable of being accommodated in matching slots 153 situated on the respective sides 154, 155 of the binoculars in order to permit the detachable attachment with ends components 156 of the binoculars 108.

The attachment upright 152 is preferably formed from lateral end walls situated to either side of the headgear 101 which extend downwards from the respective side edges 157, 158 of the visor. Each of said attachment uprights 152 is capable of being accommodated in a matching opening 159 formed in the binoculars 108, which opening is bounded laterally by edges 160, 161 in the upper and lower wall 162, 163 of the binoculars, which walls can be divided via a scored line 164, 165, and by each end wall 156 of the binoculars 108.

Said attachment uprights 152 are so arranged by means of suitable devices as to be capable of interacting with the binoculars for the purpose of locking the binoculars securely in the intended attachment position C, preferably in the form of a number of locking tongues 166, 167 cut from the upright 152 and situated at different levels. The arranged locking tongues 166, 167, etc., are so arranged as to act in an upward direction 168, for example by having their bases 166A, 167 A connected to corresponding attachment uprights 152 at the bottom.

The assembly of a cap 101 and binoculars 108 of this kind is simple, and can be clearly appreciated from FIGS. 7 and 8, and the binoculars 108 can be locked, thanks to the presence of the locking tongues 166, 167, etc., in different positions which are more or less extended in the longitudinal sense viewed between said lenses 112, 113, for the purpose of permitting the intended adjustable position between the lenses 112, 113 to be changed so that a sharp image can be obtained from the binoculars 108.

The reliable, simple and effective support of a pair of binoculars is thus achievable with said further illustrative embodiment, in conjunction with which lateral protection against disturbing light and reflexes can be achieved thanks to said lateral end walls 156, which can continue between the binoculars 108 an the rear part 101B of the cap.

Figure 9:
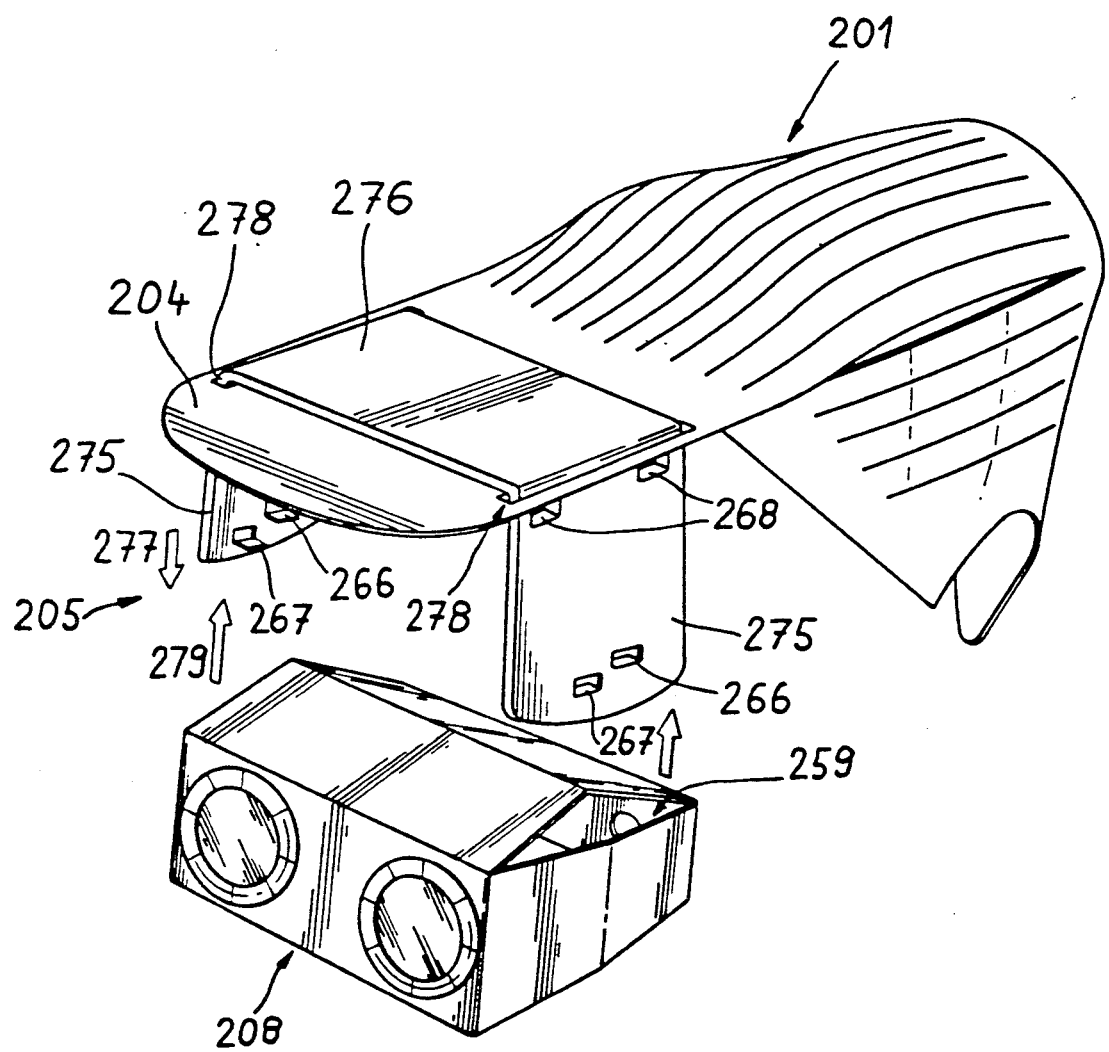
FIG. 9 shows a third illustrative embodiment of the invention.

Finally, an example of the application of the invention shown in FIG. 9 comprises a visor cap 201 of a kind similar to the embodiment shown in FIGS. 6-8, made from flexible sheet material exhibiting a number of transcurrent slits, from which sheet material the cap can be formed easily to fit the desired size of head, and an arrangement 205 for the detachable connection of a pair of binoculars 208 to the cap 201.

The binoculars 208 are similarly appropriately of the kind referred to in accordance with any of the examples given previously, in conjunction with which the connection arrangement 205 comprises a number of uprights 275 which are detachably attachable to the visor 204 of the cap, which uprights are so arranged as to be capable of connection to a pair of binoculars 208 of the kind in question, should the need arise.

The two uprights 275 can be held together by means of a bridging element 276 capable of being applied above the visor 204, which bridging element, together with the uprights 275, is in the form of an arch-shaped yoke or similar. The two attachment uprights 275, which are formed by separate parts connected to the headgear 201 and passing downwards 277 through matching, preferably slot-shaped holes 278 in the headgear 201, are capable of being accommodated in matching openings 259 in the binoculars 208 and of being locked in a similar fashion to that used in the binoculars 108 in accordance with FIGS. 6-8.

Locking tongues 266, 267, 268 can also be present on the inside of said two uprights 275, on the one hand for the purpose, as described above in accordance with the embodiment shown in FIGS. 6-8, of retaining the binoculars 208 in the desired attached position and, in a similar fashion, also to permit the secure locking of the uprights 275 to the cap visor 204 through said upper locking tongues 268 interacting with the underside of the visor and preventing the uprights 275 from being withdrawn in an upward direction 279.

Said third illustrative embodiment shown in FIG. 9 permits the invention to be applied to headgear without the headgear requiring to be modified to any great extent beforehand, as it is sufficient in this case to have two incisions 278 which pass through the visor 204 of the cap 201 in order for the invention to function.

The invention is not restricted to the illustrative example described above and shown in the drawings, but may be modified within the scope of the patent claims without departing from the idea of invention.

I claim:

1. Arrangement for headgear, comprising:
   a sun visor disposed at a front section of said headgear,
   attachment means,
   a pair of collapsible binoculars made from a sheet material,
   said binoculars detachably connected by said attachment means to said visor at an underside of said visor, said attachment means having two upright members projecting downwards from said visor to said binoculars, said upright members being arranged and constructed to detachably insert into matching openings in said binoculars, whereby said binoculars are detachably connected to said upright members and are maintained in an area in front of the eyes of a wearer.

2. Arrangement for headgear according to claim 1, wherein said upright members comprise lateral end walls of said headgear, said lateral end walls extending from lateral edges of said visor, said matching openings arranged and constructed to accommodate said lateral edges, and upper and lower wall edges and an end wall bounding said lateral end walls of said binoculars.

3. Arrangement for headgear according to claim 2, further comprising locking tongues disposed on said upright members, said locking tongues being arranged and constructed to secure said binoculars in a desired position.

4. Arrangement for headgear according to claim 1, wherein said upright members comprise arch-shaped connection elements, aid arch-shaped elements passing downwards through slots in said headgear and being accommodated in matching binocular openings.

5. Arrangement for headgear according to claim 4, further comprising locking tongues disposed on said upright members, said locking tongues disposed on said upright members, said locking tongues being arranged and constructed to secure said binoculars in a desired position.

6. Arrangement for headgear according to claim 1, further comprising locking tongues disposed on said upright members, said locking tongues being arranged and constructed to secure said binoculars in a desired position.

* * * * *